Figure 1:
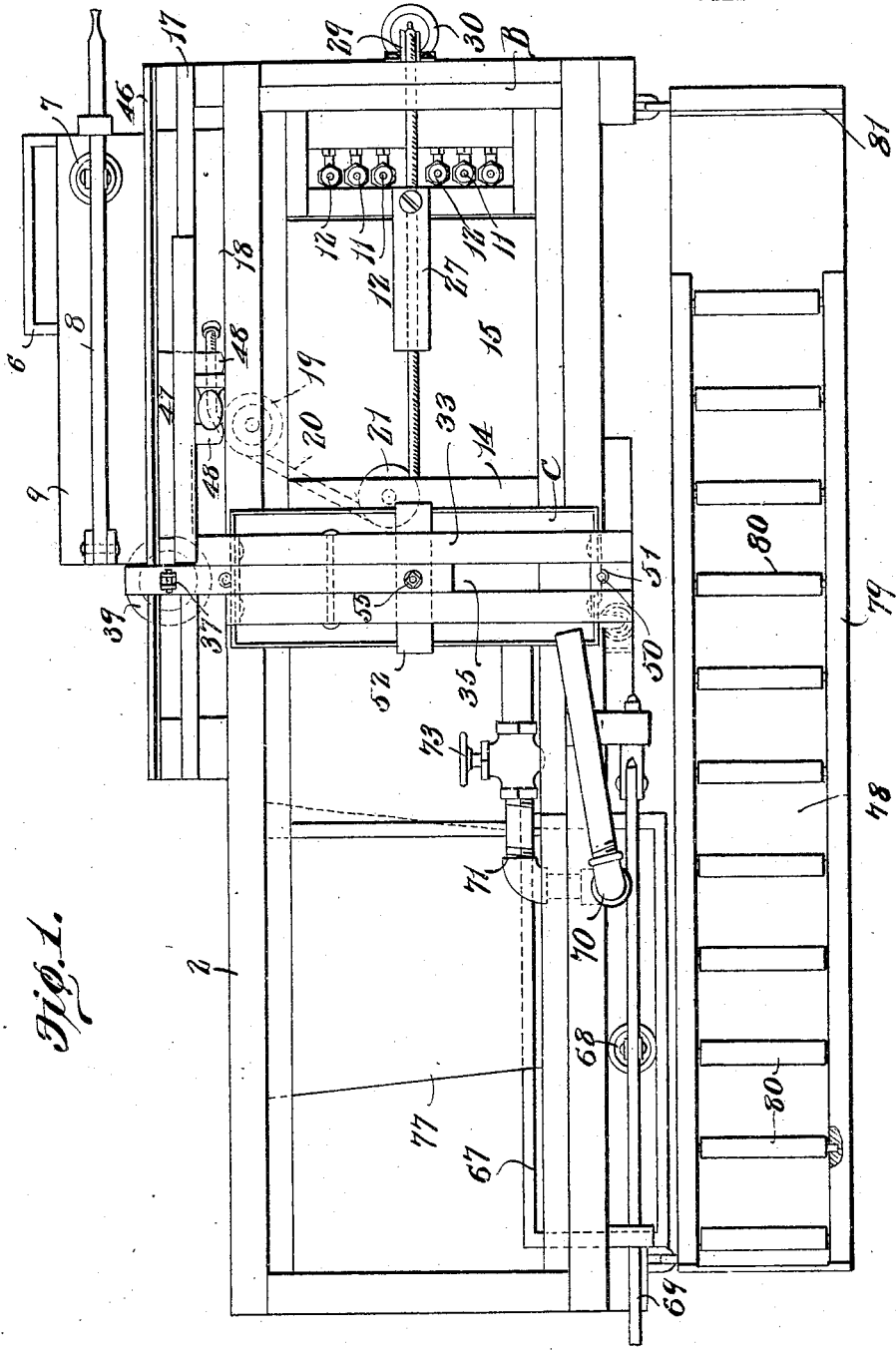

No. 852,734. PATENTED MAY 7, 1907.
R. M. MATTHEWS.
MACHINE FOR GLAZING POTTERY.
APPLICATION FILED JUNE 28, 1906.

6 SHEETS—SHEET 1.

WITNESSES: Richard M. Matthews, INVENTOR

By C. A. Snow & Co.

ATTORNEYS

No. 852,734. PATENTED MAY 7, 1907.
R. M. MATTHEWS.
MACHINE FOR GLAZING POTTERY.
APPLICATION FILED JUNE 28, 1906.

6 SHEETS—SHEET 3.

WITNESSES: Richard M. Matthews, INVENTOR,

By C. A. Snow & Co.
ATTORNEYS

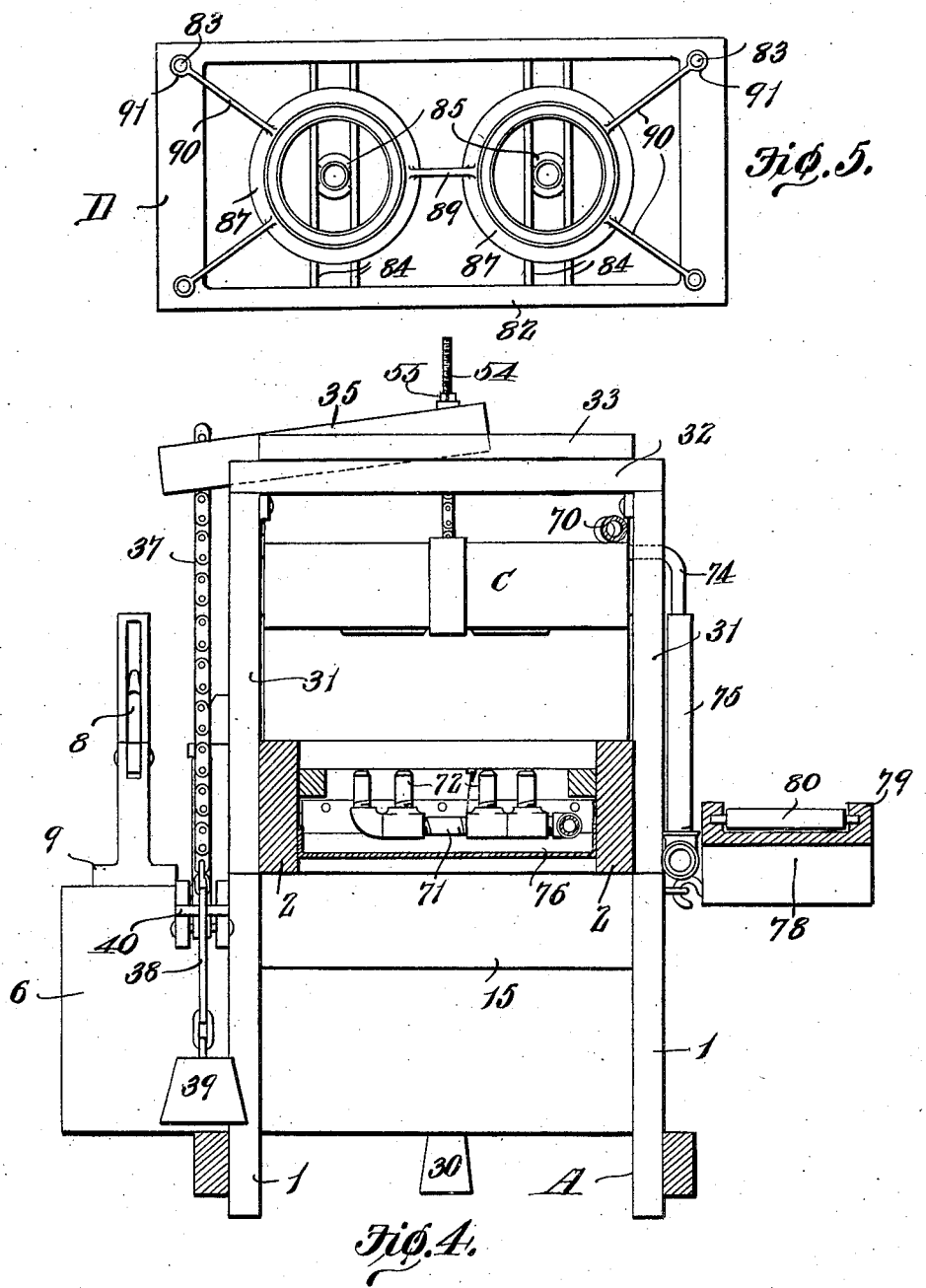

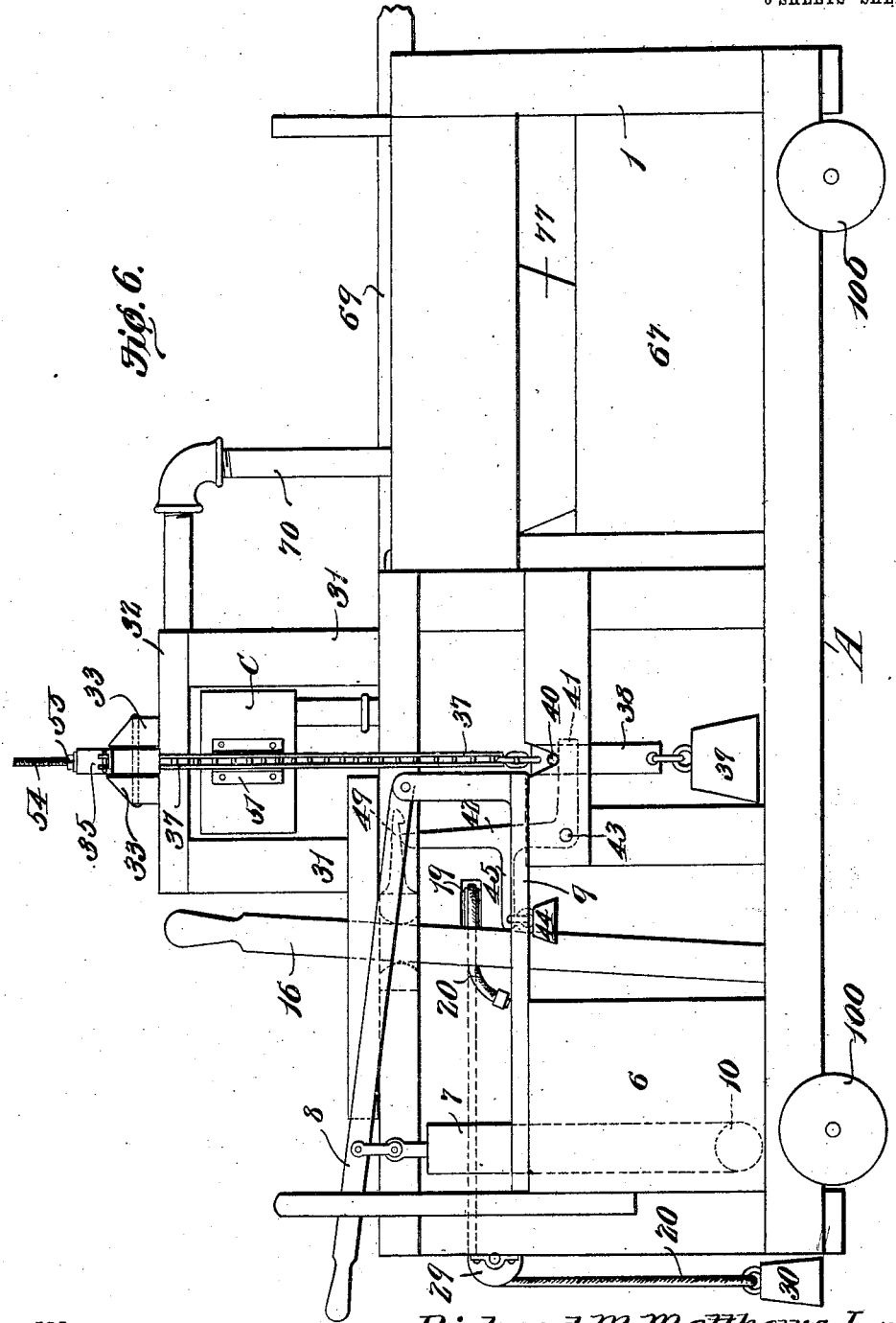

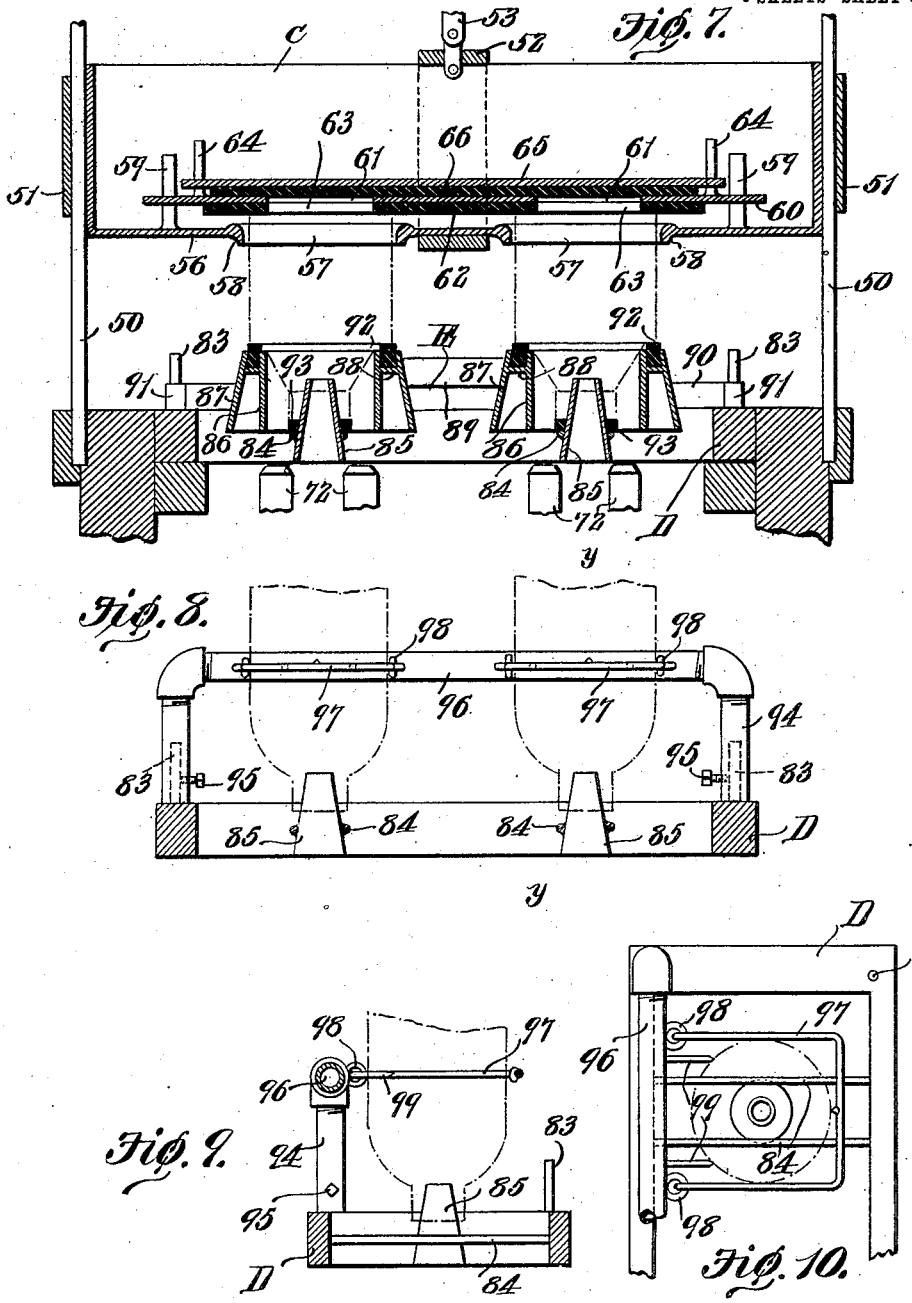

UNITED STATES PATENT OFFICE.

RICHARD M. MATTHEWS, OF METROPOLIS, ILLINOIS, ASSIGNOR OF ONE-HALF TO ROBERT K. LOWRY, OF METROPOLIS, ILLINOIS.

MACHINE FOR GLAZING POTTERY.

No. 852,734.     Specification of Letters Patent.     Patented May 7, 1907.

Application filed June 28, 1906. Serial No. 323,858.

*To all whom it may concern:*

Be it known that I, RICHARD M. MATTHEWS, a citizen of the United States, residing at Metropolis, in the county of Massac and State of Illinois, have invented a new and useful Machine for Glazing Pottery, of which the following is a specification.

This invention relates to machines for applying glaze to the ceramics, and its object is to provide a machine of this character whereby glaze of different kinds may be applied to the interior and exterior of surfaces of pottery and the like, without resulting in waste of the material or in the uneven distribution thereof upon the surfaces of the articles.

A still further object is to provide a machine by the use of which a large number of articles may be glazed simultaneously, the operation of the machine requiring at the most the services of but two operators.

A still further object is to provide a machine which is not limited to the application of glaze to any particular form or size of article.

With the above and other objects in view, the invention consists of a frame having a cross head movably mounted thereon and adapted to be manually actuated for the purpose of propelling a plurality of carriers or carriages longitudinally along the frame and beneath a tank which is suspended above the frame and is capable of vertical movement. The carriages are provided with means for supporting pottery in inverted positions and these carriages are brought successively into position beneath the vertically movable tank. Said tank is adapted to be filled with glaze of a desired color and has a valved bottom adapted to be opened to permit the escape of glaze whenever said tank is lowered, the opening of the tank being caused by the valve coming into contact with the articles on the carriages. Other tanks are disposed within the frame and means are provided whereby glaze may be directed therefrom against desired surfaces of the pottery so as to produce desired results. Trays are disposed within the frame for the purpose of returning surplus glaze to the tanks from which it was removed, and suitable forcing means is disposed in each of the tanks in the frame for the purpose of projecting the glaze under pressure and upon the faces of the pottery.

The invention also consists in certain other novel features of construction and combinations of parts, which will be hereinafter more fully described and pointed out in the claims.

In the accompanying drawings has been shown the preferred form of the invention.

Figure 2:
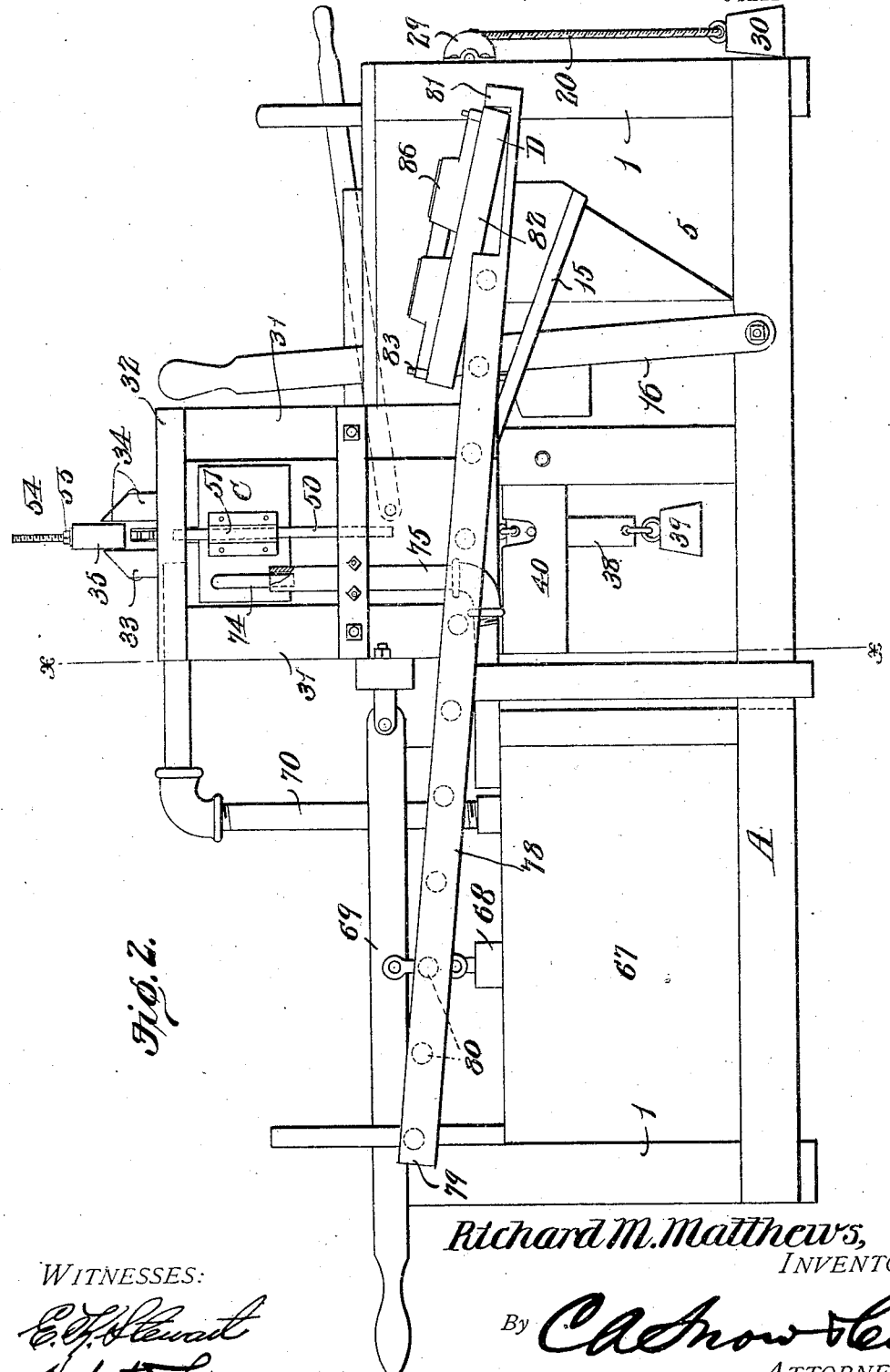
Figure 3:
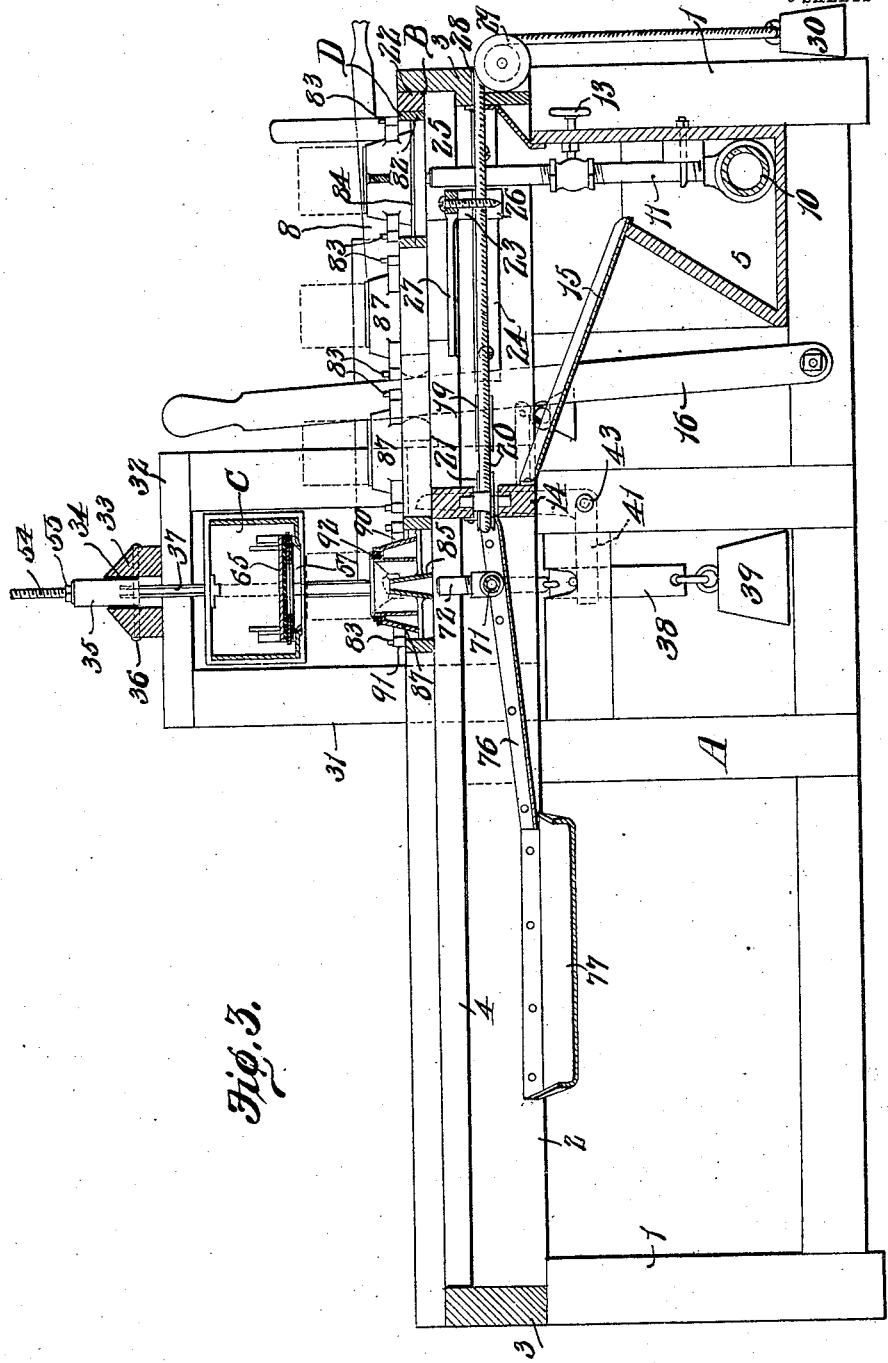

In said drawings, Figure 1 is a plan view of the complete machine. Fig. 2 is a side elevation thereof. Fig. 3 is a central longitudinal section therethrough and showing several carriages in position thereon, the pottery being indicated by dotted lines. Fig. 4 is a section, on line $x$—$x$ of Fig. 2. Fig. 5 is an enlarged plan view of one of the carriages. Fig. 6 is an elevation of the machine looking at the side thereof opposite to that shown in Fig. 2. Fig. 7 is an enlarged transverse section through the suspended tank and showing a carriage in position thereunder, the valve in the tank being shown raised by pottery which is indicated by dotted lines. Fig. 8 is a section through a carriage having a modified means for supporting pottery thereon. Fig. 9 is a section on line $y$—$y$, Fig. 8. Fig. 10 is a plan view of a portion of the modified form of the carriage.

Referring to the figures by characters of reference, A is a frame of any preferred construction, the same preferably consisting of standards 1 suitably braced and supporting side beams 2 and end beams 3. Rails, 4, are disposed longitudinally on the side beams below the upper edges thereof and extend from one end to the other of the machine. A trough 5 is disposed transversely within the frame at one end, and communicates with a glaze tank 6 arranged at one side of the machine and having a force pump 7 therein adapted to be manually actuated by a lever 8 fulcrumed at one end upon a small laterally extending platform 9 projecting from the frame A. A distributing pipe 10 extends from the pump 7 and into the trough 5 and projecting upward from this distributing pipe are groups of discharge pipes, each group consisting of a middle pipe 11 and side pipes 12. Each discharge pipe has a valve 13 whereby the discharge of liquid therethrough may be controlled. A cross beam 14 connects the side beams 2 at a point removed a desired distance from one end of the beam, and extending downward from this cross beam is an inclined tray 15 which extends the entire width of the frame and serves to direct waste, or surplus glaze, into the trough 5.

A lever 16 is fulcrumed upon one side of the frame A and is held in proper relation to said sides of the frame by means of a guide strip 17 which forms a slot 18 in which the lever is adapted to oscillate. A pulley 19 is mounted in an opening in the side of the frame and mounted on this pulley is a rope 20 which is secured to the lever 16 and extends partly around a pulley 21 journaled in the central portion of the cross beam 14. A cross head B is movably mounted upon the frame and consists of an upper cross strip 22 which is mounted on the rails 4 and a lower cross strip 23, which is mounted on guides 24 secured to the side beams 2. These two cross strips are connected with side strips 25 and the rope 20 is fastened to the strip 23 in any preferred manner and is preferably clamped thereagainst by a bottom block 26. A tongue 27 extends from the center of the cross head and is adapted to contact with the cross beam 14 to limit the movement of the cross head. Rope 24 extends under the cross head and through an opening 28 in the beam 3 at the front end of the machine, and a pulley 29 supports the rope at this point. A weight 30 is fastened to the end of the rope and serves to hold the cross head normally in position against the front beam 3.

Standards 31 extend upward from the side beams 2 and are connected at their upper ends, as shown at 32, to support a top beam 33 which extends transversely of the frame and is slotted longitudinally, as shown at 34. A lever 35 is fulcrumed within this slot, as upon a pin 36, and a chain 37 extends downward from its outer end and is connected to a plate 38 from which is suspended a weight 39. This plate has laterally extending fingers 40 which bear upon a fork 41 embracing the plate 38. This fork constitutes one arm of a bell crank lever 42 which is fulcrumed upon the side of the frame, as shown at 43, and has a weight 44 suspended from an arm 45 which extends horizontally from the bell crank lever at a point above its fulcrum. The weight 44 is merely sufficient to hold the fork 41 pressed upward against the fingers 40. A rail 46 is secured to, and spaced from, the strip 17 and, with said strip, constitutes a track for a slide 47 having laterally extending ears 48 which embrace the lever 16 so that each time said lever is oscillated the slide is reciprocated. A hooked arm 49 extends from the slide and is adapted to engage the upstanding portion of bell crank lever 42, so that every time the lever 16 is swung toward the front of the machine, the hook will trip the bell crank lever 42 and cause its forked member 41 to press upward on the fingers 40 so as to raise the weight 39 and relieve the chain 37.

Vertically extending guide rods 50 are disposed upon the side beams 2 and between the standards 31, and mounted on these guide rods are sleeves 51 formed at the ends of a tank C. This tank has a cross strip 52 connecting opposite edges and extending across the central tank, and a chain 53 connects the center of the cross strip 52 with a screw threaded stem 54 slidably mounted within the lever 35 and adapted to be adjusted longitudinally therein by means of a nut 55. The bottom 56 of the tank has a desired number of openings 57 therein, each of which is surrounded by a depending annular flange or bead 58. Stems 59 project upward from the bottom 56 and project loosely through the corners of a valve plate 60 in which are formed circular openings 61 disposed directly above, but of less diameter than, the openings 57. A bottom strip 62 of leather, or other flexible material, is disposed upon the lower face of valve plate 60 and also has openings 63 therein which register with the openings 60. Stems 64 project upward from the valve plate 60 and are loosely mounted in the corners of a top plate 65 having a bottom strip 66 of leather or other suitable material which normally rests on the valve plate 60 and closes the openings 61. The weight 39 is sufficient to overbalance the tank C and the parts connected thereto, and also the weight 44. It is therefore obvious that the filled tank C normally assumes a position close to the slotted beam 33, as shown particularly in Figs. 2, 3 and 6.

A glaze tank 67 is arranged at one side of the frame A adjacent the rear thereof, and mounted in this tank is a force pump 68 adapted to be manually actuated through a lever 69. Extending from the pump 68 is an outlet pipe 70 which opens above the tank C and is adapted to discharge glaze thereinto. A branch pipe 71 extends from the pipe 70 and is provided with a plurality of nozzles 72 which are located directly beneath the tank C. A valve 73 is arranged in the pipe 71 for controlling the discharge of glaze through the nozzles 72. An overflow pipe 74 extends from one end of the tank C near the top thereof and telescopes into a stationary pipe 75 which opens into the tank 67. An inclined tray 76 extends from the cross beam 14 and beneath tank C and nozzles 72 and serves to direct the surplus glaze into a transversely extending trough 77 which opens into the tank 67.

An inclined platform 78 is arranged upon one side of the frame A and extends downward from the rear end thereof toward the front of the machine, and this platform has side flanges 79 between which are mounted rollers 80. The front, or lower end, of the platform has a stop flange 81.

A carriage D of peculiar form is used in connection with this machine for the purpose of supporting pottery in proper position to receive glaze, and this carriage consists of a rectangular frame 82 adapted to rest and travel upon the rails 4 and to abut against the top strip 22 of the cross head B. Posts 83 extend upward from the corners of the frame 82 and cross rods 84 are disposed in pairs within the frame, one pair of these rods being provided for each opening in the bottom of tank C. A frusto-conical tube 85 is carried by each pair of rods 84 and these grooves are open at their ends, their small ends being uppermost. The tubes are so located that when the carriage is in its normal position upon the front of the machine, the middle nozzles or pipes 11 are disposed directly beneath the tubes 85 and can direct glaze into said tubes. The tubes 12, however, when the parts are in this position, will direct glaze to opposite sides of the tubes 85.

The carriage B is adapted to support a holder E of novel construction and which consists of a plurality of gaskets 86, each of which is surrounded by a jacket 87 spaced therefrom by an annular partition 88. The jackets of the gaskets are connected by intermediate arms 89 and arms 90 diverge from the ends of the holder E and have sleeves 91 adapted to be seated upon the posts 83. Rubber washers 92 are fitted between the gaskets and the jackets and rest on the partitions 88, said washer projecting above the gaskets and constituting soft seats for the pottery to be glazed. The gaskets of the holder E are equal in number to the tubes 85, and are spaced apart so that the said tubes will project into the centers of the gaskets and leave a clear space therearound into which glaze may be discharged from the pipes 12. Washers 93, preferably formed of rubber, surround the tubes 85 and bear on the rods 84. These washers are removable and may be dispensed with, if desired.

As hereinbefore stated, the machine herein described may be used for applying two different kinds of glaze to the interior and exterior surfaces of pottery, although the same is equally useful in applying the same kind of glaze to all the surfaces of the pottery. Where it is desired to apply, for example, a white glaze and a black glaze, so that the interior surface of the pottery will be rendered black and the outer surface white, the tank 6 is filled with black glaze, and white glaze is placed within the tanks C and 67. The valves in pipes 11 are opened, as is also the valve 73 in pipe 71, and the machine is then ready for use. If jugs are to be glazed, the same are inverted and placed with their shoulders on the washers 92 of holders E, and with their necks surrounding the tubes 85 and resting on the washers 93. The carriage containing the jug is then placed on the track 4 and against the upper strip 22 of the cross head B. The operator at the front end of the machine now actuates lever 8 so as to force black glaze into the pipe 10 and through the middle pipes 11. These middle pipes will direct the glaze through the tubes 85 and into the jugs, registering therewith, and therefore the glaze will be thrown into contact with all portions of the interior surface of the jug. Upon the completion of this operation, the lever 16 is thrown forward and pulls on the rope 20, which causes the cross head B to slide on track 4 until its tongue 27 abuts against the cross beam 14. The carriage D will, of course, be moved with the cross head, and as soon as the lever 16 is released, the weight 30 will return it to its original position and also throw the cross head 3 back against the front of the frame A. This return movement of the cross head will leave the carriage in position on the track 4 and above the tray 15, and at a distance from the front of the frame slightly greater than the width of the carriage, so that another carriage containing inverted jugs can be placed on the cross head and the injection of glaze repeated in the manner described. The pottery will, of course, drain onto the tray 15, which will return to the trough 5 any surplus glaze. This operation is continued until the first carriage arrives in position directly beneath the tank C above the nozzles 72.

Each time the lever 16 is drawn forward for the purpose of actuating the cross head B, the hook 49 on slide 47 pulls on the bell crank lever 42 so as to cause the fork 41 to raise the fingers 40 and relieve the chain 37 of weight 39. As the support of tank C is then removed, said tank will be lowered, and the valve within the tank will be brought into contact with the bottoms of the jugs on the carriage thereunder, said jugs projecting into the apertures 57 in the tank whenever the same is lowered, and as shown by dotted lines in Fig. 7. Obviously, as soon as this valve is raised, a large portion of the glaze within the tank will flow downward through the openings 57 and around the jug, thereby glazing all of the outer surface of the body of the jug. The surplus glaze will flow onto the tray 76 and into the trough 77 and thence to the tank 67. Simultaneously with this operation, the operator at the rear end of the machine actuates the pump 68 and this results in the discharge of glaze through the nozzle 72 and into the gaskets 88 and around the tubes 85. As a result of this operation, glaze is thrown upon the neck of the jug. The actuation of pump 68 will also result in the supplying of glaze to the tank C, and any overflow will return to the tank 67 through pipes 74 and 75. Each time a new carriage comes under the tank C, said tank is depressed by the actuation of the lever 16 and at the same time the operator at the rear of the machine directs glaze through nozzle 72.

It is to be understood that the tank C does not remain lowered during the entire forward movement of the lever 16, but only during the short period in which the hook 47 engages the bell crank lever 42. After lever 16 has traveled a predetermined distance, the hook 49 will escape from the lever 42 so that weight 49 will return all of the parts to their original positions.

Should it be desired to apply black glaze to the neck, as well as to the interior, of the jugs, the pipes 12, as well as pipes 11, are opened, so that glaze will be simultaneously discharged through them, both into the tubes 85, and into the gaskets 86, thereby distributing the glaze over the interior surfaces of the jugs, as well as upon the exterior surfaces of the necks. It is, of course, understood that in this operation, the nozzles 72 remain closed, and white glaze is only supplied to the exterior surfaces of the jugs from the tank C in the manner described heretofore. Should it be desired to apply the same glaze to all the interior and exterior surfaces of the jugs, it is, of course, merely necessary to use the same kind of glaze in all the tanks. Obviously, the washers 93 will prevent the application of glaze to the end of the neck. However, should this be deemed desirable, said washers may be dispensed with, and the glaze will then be free to strike the ends of the necks while being directed against their outer faces. It is, of course, understood that gaskets of different sizes will be utilized for holding jugs, etc., of different sizes, and by adjusting the tank C vertically by means of the stem 54, and nut 55, said tank can be caused to properly coöperate with either long or short jugs. The platform 78 is provided, so that the operator at the rear end of the machine can successively remove the carriages after they have passed through the machine and, after detaching the glazed jugs, can place the carriages on the rollers 80, so that they will move by gravity along the platform to the front end of the machine for reuse.

The holder E heretofore described is adapted for use with jugs and like articles having angular shoulders at the bases of their necks, and said holders would obviously be undesirable for use in connection with articles in which these shoulders are not employed. For articles of this character, a holder such as is shown in Figs. 8, 9 and 10, is preferably utilized. This holder consists of two tubular standards 94 adapted to be placed upon posts 83 at each end of the carriage D and to be secured thereon by means of set screws 95, or in any other desired manner. These standards 94 are connected by a rod 96 having yokes 97 pivotally connected thereto, as by means of eyes 98, and these yokes are so disposed as to embrace the article to be glazed and hold it steadily upon the tube 85 thereunder, said tube consituting a support for the article, although, if desired, a washer 93 may be employed as a support. Fingers 99 extend from the rod 96 and coöperate with the yokes 97 for the purpose of holding the jug or other article rigidly in an upright position. Where a holder such as herein described is utilized, it is, of course, necessary to apply the same kind of glaze over all of the exterior surfaces thereof.

It will be understood that the capacity of this machine can be enlarged by widening it and making the carriages longer, so that a greater number of articles can be held upon the carriage. The number of pipes 11 and 12, nozzles 72, and openings 57 in tank C must, of course, be correspondingly increased.

From the foregoing description, it will be apparent that the services of the two operators are necessary in order to glaze jugs or other pottery, and there is practically no waste of glaze, for the reason that any surplus discharged against the pottery is collected and returned to the tanks from which it was removed, and, moreover, the glazed articles are maintained in an inverted position a sufficient length of time to allow any drippings to fall on the the proper trays and to be returned to the proper tanks. By placing wheels 100 upon the bottom of the frame A, said frame can be readily moved from place to place, so that the collection of pottery to be glazed will be greatly facilitated.

What is claimed is:—

1. In a machine of the character described the combination with a holder; of a counterbalanced tank thereabove having a normally closed outlet, and means for relieving the tank of the weight of the counterbalance to cause the tank to lower and its outlet to open by contact with an article on the holder.

2. In a machine of the character described the combination with a counterbalanced tank having an outlet, and means for normally closing the outlet; of a holder movable beneath the tank and adapted to hold an article in position to open the outlet when the tank is lowered, and means for relieving the tank of the weight of its counterbalance to cause said tank to automatically lower.

3. In a machine of the character described, the combination with a movable counterbalanced tank having an outlet, and means for normally closing the outlet; of a holder movable beneath the tank and adapted to support an article below the outlet, and means for releasing the tank from its counterbalance for actuating the tank to bring the closure into contact with said article.

4. In a machine of the character described, the combination with a movable tank having a normally closed outlet and a vertically movable support therefor; of a holder movable beneath the tank and adapted to support an article below the outlet, and means for raising the tank support for moving the tank to project said article into the outlet and open the same.

5. In a machine of the character described, the combination with a movable tank having a normally closed outlet and a gravity operated support therefor; of a holder movable beneath the tank and adapted to support an article under the outlet, and means for successively moving the holder and moving the support to lower the tank to project said article into the outlet to open it.

6. In a machine of the character described, the combination with a movable tank having an outlet, a closure for said outlet and a gravity operated support for said tank; of a holder for supporting an article to be glazed, and means for successively moving the holder into position beneath the tank and for raising the support to depress the tank to bring the closure into contact with the article to open the outlet.

7. In a machine of the character described, the combination with a movable tank having an outlet in the bottom thereof a closure normally seated upon the outlet and a gravity operated support for said tank; of a holder for supporting an article to be glazed, means for moving the holder into position beneath the tank, and mechanism for raising the support to move the tank toward the holder to bring its closure in contact with said article to open the outlet.

8. In a machine of the character described, the combination with a tank having an outlet in the bottom thereof, a closure for the outlet, and gravity operated means for normally supporting the tank; of a holder adapted to support an article to be glazed, means for moving the holder into position beneath the tank, and mechanism for moving the closure into contact with said article to open the outlet.

9. In a machine of the character described, the combination with a normally raised vertically movable tank having an outlet in the bottom thereof, a valve within the tank and normally closing the outlet and a gravity operated support for the tank; of a holder, means for moving the holder into position beneath the tank, and mechanism for raising the support to lower the tank to bring its valve into contact with an article on the holder to open the outlet.

10. In a machine of the character described, the combination with a vertically movable tank having an outlet in the bottom thereof and a valve within the tank and normally closing the outlet, of a supporting frame, a flexible support for the tank mounted on the frame, gravity operated means upon said connection for holding the tank normally raised, and means for raising the connection to lower the tank.

11. In a machine of the character described, the combination with a vertically movable tank having an outlet in the bottom thereof and a valve within the tank and normally closing the outlet; of a support, a weighted flexible device mounted upon the support and connected to the tank, and manually operated means for raising the weight to permit the tank to lower by gravity.

12. In a machine of the character described, the combination with a vertically movable tank having an outlet in the bottom thereof and a valve within the tank and normally closing the outlet; of a support, a weighted flexible device mounted upon the support and connected to the tank, a holder for supporting an article to be glazed, and means for moving said holder into position beneath the tank and for lifting the weight to permit the tank to lower by gravity.

13. In a machine of the character described, the combination with a tank and weighted means for normally supporting the tank in a raised position, said tank having a normally closed outlet in the bottom thereof; of a holder for supporting an article to be glazed, of an actuating lever, means operated thereby for moving the holder to a position below the tank, and mechanism actuated by the lever for lifting the weighted means to lower the tank by gravity.

14. In a machine of the character described, the combination with a vertically movable tank having an outlet in the bottom thereof and a valve in the tank normally closing the tank; of a supporting frame, a weighted flexible device carried by the frame and supporting the tank normally in a raised position, a forked lever engaging the weighted flexible device, a slide for actuating the lever to raise said device, and means for actuating the slide.

15. In a machine of the character described, the combination with a supporting frame, a vertically movable tank therein having an outlet in its bottom, and a valve within the tank and normally closing the outlet; of a weighted flexible support movably mounted on the frame and normally holding the tank in raised position, a hooked slide, a lever normally engaged by the slide and engaging the weighted flexible support, and means for actuating the slide to trip the lever and raise the weighted support.

16. In a machine of the character described, the combination with a supporting frame, a vertically movable tank, and a weighted flexible support movably mounted on the frame and connected to the tank; of a forked lever engaging the flexible support, a tripping slide mounted on the frame and adapted to engage the lever to actuate it and lift the weighted support, and manually operated means for actuating the tripping slide.

17. In a machine of the character described, the combination with a frame, a tank having a normally closed outlet in its bottom and a weighted flexible support connected to the tank and mounted on the frame; of a lifting device engaging the flexible weighted support, a holder slidably mounted on the frame, and manually operated means for actuating the lifting device and moving the holder into position beneath the tank.

18. In a machine of the character described the combination with a frame, and a tank carried thereby; of a holder movably mounted on the frame and adapted to support an article in a stationary inverted position to be glazed, a tube carried by the holder and adapted to project into the mouth of an article to be glazed, and means for spraying glaze into and through the tube.

19. In a machine of the character described, the combination with a frame and a tank carried thereby; of a holder movably mounted on the frame and adapted to support an article to be glazed, and means for directing glaze from the tank into, and upon the outer faces of, said article.

20. In a machine of the character described, the combination with a frame and a tank carried thereby; of a holder movably mounted on the frame and adapted to support an article to be glazed, and means for directing glaze from the tank into and upon the outer surface of said article either simultaneously or separately.

21. In a machine of the character described, the combination with a frame and a tank carried thereby; of a tube movably mounted on the frame, a discharge pipe extending from the tank and adapted to register with the tube, discharge pipes extending from the tank and adapted to extend to opposite portions of the tube, and means for independently controlling passage of liquid through said pipes, said tube constituting a support for an inverted article.

22. In a machine of the character described, the combination with a frame and a tank carried thereby; of a gasket for supporting an article to be glazed, means for directing glaze from the tank and into the gasket and around the said article, and means for directing glaze into the article.

23. In a machine of the character described, the combination with a frame and a tank carried thereby; of a gasket for supporting an article to be glazed, means for directing glaze from the tank and into the gasket and around the said article, means for directing glaze into the article, and independently operated means for controlling the discharge of glaze around and into said article.

24. In a machine of the character described, the combination with a frame; and a tank carried thereby; of a movable tank supported above the frame and having a normally closed outlet in the bottom thereof, manually operated means for directing glaze into the movable tank from the first mentioned tank, and a return pipe for conducting overflow from the movable tank to the first mentioned tank.

25. In a machine of the character described, the combination with a frame and a tank carried thereby; of a movable tank supported above the frame and having a normally closed outlet in the bottom thereof, manually operated means for directing glaze into the movable tank from the first mentioned tank, a return pipe for conducting overflow from the movable tank to the first mentioned tank, and means for returning surplus discharge glaze to said first mentioned tank.

26. In a machine of the character described, the combination with a frame having guides thereon; of a vertically movable tank mounted on the guides and having a normally closed outlet in the bottom thereof, a lever fulcrumed upon the frame, a flexible connection between the lever and tank, and a weight suspended from the lever to hold the frame normally raised.

27. In a machine of the character described, a carriage comprising a slidable frame, and frusto-conical article engaging and supporting tubes supported by the frame and open at their ends.

28. In a machine of the character described, a carriage comprising a slidable frame, a frusto-conical article engaging tube supported by the frame, and a supporting washer carried by the tube said tube being open at its ends.

29. In a machine of the character described, the combination with a carriage comprising a frame, and stems upstanding therefrom; of a gasket, a jacket surrounding the same, a supporting washer extending beyond the jacket and gasket, and means for detachably securing the gasket to the stems.

30. In a machine of the character described, the combination with a carriage comprising a frame, stems upstanding therefrom, and a tube carried by the frame and open at its ends; of a holder mounted on the stems, and means carried by the holder for encircling an article to be glazed and centering it upon the tube.

31. In a machine of the character described, the combination with a carriage comprising a frame, stems upstanding therefrom, and a tube mounted on the carriage and open at its ends; of a gasket concentric with and surrounding the tube, a jacket surrounding the gasket, and means for connecting the jacket to the stems.

32. In a machine of the character described, the combination with a carriage comprising a frame, stems upstanding therefrom, and a tube mounted on the carriage and open at its ends; of a gasket concentric with and surrounding the tube, and means for connecting the jacket to the stems.

In testimony that I claim the foregoing as my own, I have hereto affixed my signature in the presence of two witnesses.

RICHARD M. MATTHEWS.

Witnesses:
    J. D. BERRY, Jr.,
    A. PARKER.